US010198219B2

(12) United States Patent
Sines

(10) Patent No.: US 10,198,219 B2
(45) Date of Patent: Feb. 5, 2019

(54) METHOD AND APPARATUS FOR EN ROUTE TRANSLATION IN SOLID STATE GRAPHICS SYSTEMS

(71) Applicant: ATI Technologies ULC, Markham (CA)

(72) Inventor: Gabor Sines, Markham (CA)

(73) Assignee: ATI Technologies ULC, Markham, Ontario (CA)

( * ) Notice: Subject to any disclaimer, the term of this patent is extended or adjusted under 35 U.S.C. 154(b) by 56 days.

(21) Appl. No.: 15/608,370

(22) Filed: May 30, 2017

(65) Prior Publication Data

US 2018/0349062 A1 Dec. 6, 2018

(51) Int. Cl.
*G06F 3/06* (2006.01)
*G06F 9/48* (2006.01)
*G06F 9/50* (2006.01)
*G06F 17/28* (2006.01)
*G06F 17/30* (2006.01)

(52) U.S. Cl.
CPC ............ *G06F 3/0661* (2013.01); *G06F 9/485* (2013.01); *G06F 9/5016* (2013.01); *G06F 17/289* (2013.01); *G06F 17/30569* (2013.01)

(58) Field of Classification Search
None
See application file for complete search history.

(56) References Cited

U.S. PATENT DOCUMENTS

| 2013/0067186 | A1* | 3/2013 | Pronovost | G06F 12/02 711/170 |
| 2016/0018999 | A1* | 1/2016 | Stenfort | G06F 3/0607 711/154 |
| 2017/0083594 | A1* | 3/2017 | Chang | H04L 67/2823 |
| 2018/0052785 | A1* | 2/2018 | Suh | G06F 13/1673 |
| 2018/0068000 | A1* | 3/2018 | Messaoud | G06F 17/30569 |
| 2018/0205801 | A1* | 7/2018 | Kovacs | H04L 67/2823 |

* cited by examiner

*Primary Examiner* — Jeffrey Chow
(74) *Attorney, Agent, or Firm* — Volpe and Koenig, P.C.

(57) ABSTRACT

Described herein is a method and apparatus for en route translation of data by a data translation logic (DTL) on a solid state graphics (SSG) device as the data moves from a first memory architecture on the SSG device to a second memory architecture associated with a graphics processing units (GPU) on the SSG device or from the first memory architecture on the SSG device to a host memory in a host system that is connected to the SSG device.

20 Claims, 7 Drawing Sheets

METHOD AND APPARATUS FOR EN ROUTE TRANSLATION IN SOLID STATE GRAPHICS SYSTEMS

CROSS-RELATED APPLICATIONS

This application is related to U.S. patent application Ser. No. 15/582,479, filed Apr. 28, 2017, U.S. patent application Ser. No. 15/389,596, filed Dec. 23, 2016, U.S. patent application Ser. No. 15/389,747, filed Dec. 23, 2016, U.S. patent application Ser. No. 15/389,811, filed Dec. 23, 2016 and U.S. patent application Ser. No. 15/389,908, filed Dec. 23, 2016, which are incorporated by reference as if fully set forth.

BACKGROUND

Data is stored in storage systems, such as for example a solid state graphics (SSG) device, in data or file formats (collectively "file format"), such as for example, Graphics Interchange Format (GIF), Joint Photographic Experts Group (JPEG) and other file formats. The type of file format used can depend on a number of factors including amount of data, storage capacity, content type and ease of data mobility or transfer. For example, large data files can be stored efficiently using specific techniques not supported by a requesting or target device. In this instance, the stored data is not in a clear form with respect to a target device, such as for example, a graphics processing unit (GPU). That is, the stored data is not in a readily useable form for use by the target device. In these instances, the target device typically performs a data reformatting process. This leads to a number of issues including latency and system performance.

BRIEF DESCRIPTION OF THE DRAWINGS

A more detailed understanding may be had from the following description, given by way of example in conjunction with the accompanying drawings wherein.

DETAILED DESCRIPTION

Described herein is a method and apparatus for en route translation of data by a data translation logic (DTL) on a solid state graphics (SSG) device as the data moves from a first memory architecture on the SSG device to a second memory architecture associated with a graphics processing units (GPU) on the SSG device or from the first memory architecture on the SSG device to a host memory in a host system that is connected to the SSG device.

In general, the SSG device includes DTL, GPU(s) or discrete GPU(s) (dGPU(s)) (collectively GPU(s)), second memory architectures associated with the GPU(s), first memory architecture(s) and first memory architecture controller(s) (collectively a first memory architecture unit). The SSG device further includes an expansion bus interface that is connected to or in communication with (collectively "connected to") the first memory architecture controller(s), the DTL and can be connected to a host system. The expansion bus interface can be a Peripheral Component Interconnect Express (PCIe) or other electrical or communication interfaces. The first memory architecture can be a non-volatile memory (NVM) or other similarly used memories, for example, along with associated controllers. The second memory architecture can be a local memory, a high bandwidth memory (HBM), a double data rate fourth-generation synchronous dynamic random-access memory (DDR4), a double data rate type five synchronous graphics random access memory (GDDR5), a hybrid memory cube or other similarly used memories, for example, along with associated controllers. For purposes of illustration and discussion, the terms NVM and local memory will be used in the description without limiting the scope of the specification and claims.

Illustrative configurations for the SSG device are described in U.S. patent application Ser. No. 15/582,479, filed Apr. 28, 2017, U.S. patent application Ser. No. 15/389,596, filed Dec. 23, 2016, U.S. patent application Ser. No. 15/389,747, filed Dec. 23, 2016, U.S. patent application Ser. No. 15/389,811, filed Dec. 23, 2016 and U.S. patent application Ser. No. 15/389,908, filed Dec. 23, 2016, which are incorporated by reference as if fully set forth. Each implementation permits a different type of user or vendor configuration flexibility. Although the figures show a dGPU, any GPU can be used without departing from the scope of the specification or claims. These configurations are illustrative and other configurations can be implemented within the scope of the description and claims.

Figure 1:
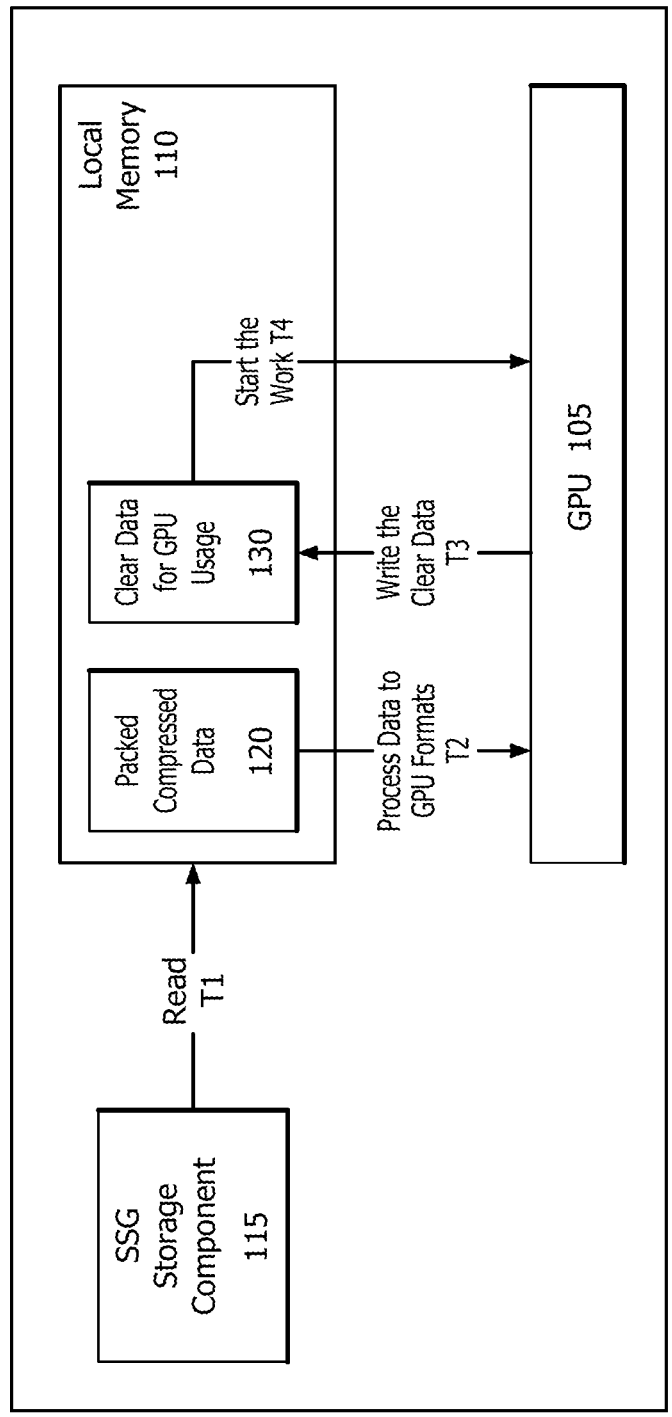
FIG. 1 is a conventional method for transferring data from a solid state graphics (SSG) device to a graphics processing unit (GPU) local memory.
Figure 2:
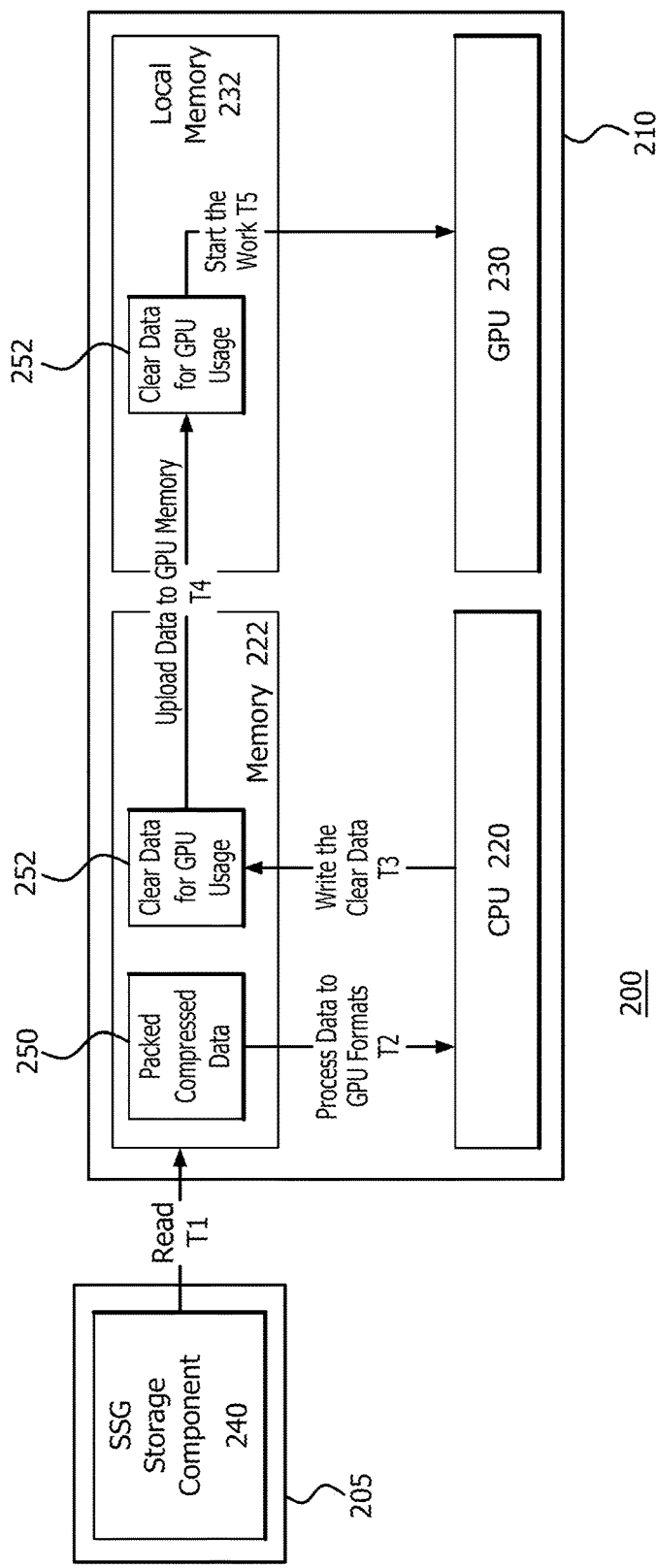
FIG. 2 is a conventional method for transferring data from a SSG device to a graphics processing unit (GPU) local memory via a central processing unit (CPU)

FIGS. 1 and 2 illustrate the issues with systems that do not have DTL on the SSG device. FIG. 1 illustrates a SSG device 100 which includes a graphics processing unit (GPU) 105 connected to or coupled with (collectively "connected to") a local memory 110 and capable of receiving data from a SSG storage component 115. In the event GPU 105 executes a data transfer command that requires data from SSG storage component 115, data is read from SSG storage component 115 at time T1. This data is packed and compressed in a specific file format (120). The data can have other file characteristics that are specific to storage on SSG storage component 115. In order for GPU 105 to use the data, the data is reformatted by GPU 105 at time T2 into a data format useable by GPU 105. This is referred to as the data being in clear or clean form (130) or the data being clear data, where clear data is a data layout in the local memory of a GPU that can be consumed by the GPU directly. GPU 105 then writes the clear data (130) to local memory 110 for storage at time T3. Once the clear data (130) is stored in local memory 110, GPU 105 can start using clear data (130) at time T4. Consequently, the time delay from reading to using the data is T1+T2+T3+T4.

FIG. 2 illustrates a processing system 200 that includes a SSG device 205 connected to a host processing system 210 that includes a central processing unit (CPU) 220 with an associate memory 222 and a GPU 230 with a local memory 232. SSG 205 includes a SSG storage component 240. In the event CPU 220 (for use by GPU 230) or GPU 230 executes a data transfer command that requires data from SSG storage component 240, data is read from SSG storage component 240 at time T1. This data is packed and compressed in a specific file format (250). The data can have other file characteristics that are specific to storage on SSG storage component 240. In order for GPU 230 to use the data, the data is reformatted by CPU 220 at time T2 into a data format useable by GPU 230. This is also referred to as the data being clear data (252) or in clean form. CPU 220 then writes the clear data (252) to memory 222 for storage at time T3. The clear data (252) is then uploaded to local memory 232 at time T4. Once the clear data (252) is stored in local memory 232, GPU 230 can start using clear data (252) at time T5. Consequently, the time delay from reading to using the data is T1+T2+T3+T4+T5. As illustrated in FIGS. 1 and 2, the overall system performance is bound by the data format and the time needed to process the data.

Figure 3:
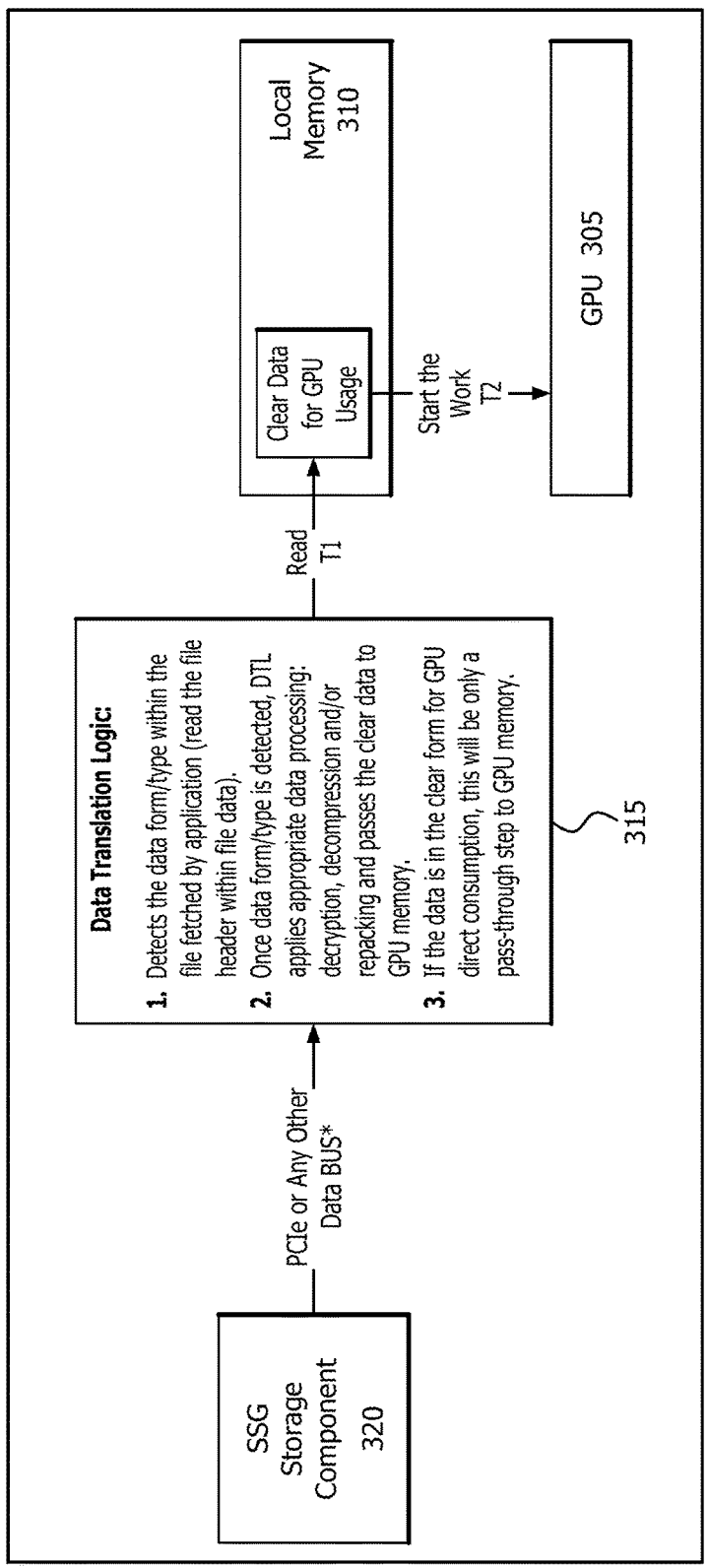
FIG. 3 is a high level block diagram for transferring data from a SSG device to a GPU local memory via data translation logic (DTL) in accordance with certain implementations.

FIG. 3 illustrates a high-level block diagram of a SSG device 300 that provides en route translation of data by data translation logic (DTL) 315 on SSG device 300 in accordance with certain implementations. In particular, SSG device 300 includes a GPU 305 with a local memory 305, DTL 315 and SSG storage component 320. DTL 315 is connected to SSG storage component 320 via a data bus, such as for example, a Peripheral Component Interconnect Express (PCIe). PCIe is shown for purposes of illustration and other electrical or communication interfaces may be used. DTL 315 can be implemented as on-board fixed function hardware such as a field-programmable gate array (FPGA), Direct Memory Access (DMA) controller or other similar functionality, hardware, structure or circuit. DTL 315 is configured to output data in the clear form. It is designed to support GPU clear form memory layouts. These memory layouts may be referred to as buffers, image formats, textures and other similar constructs.

In the event GPU 305 executes a data transfer command that requires data from SSG storage component 320, data is read from SSG storage component 115 at time T1. As stated above, this data is packed and compressed in a specific file format that is specific to storage on SSG storage component 320. DTL 315 determines en route whether the data is in clear form for use by GPU 305. The determination is done by detecting the content/data form or type (collectively "data form") within the data or data file. For purposes of illustration only, a file header can be read by DTL 315 to determine the data form. Other methods can be used. If the data is not in a form useable by GPU 305, DTL 315 applies on-the-fly appropriate data processing to the read data including, but not limited to, decryption, decompression, textured, repacking, mathematical transformations that need to be done for target device, and other data format processing. That is, DTL 315 performs en route translation or modification of the read data as it moves from SSG storage component 115 to local memory 310, for example. After modification, DTL 315 sends the now clear data to local memory 310 for storage and use by GPU 305 at time T2. If the read data is in clear form, DTL 315 passes the data to local memory 310 for storage and use by GPU 305 at time T2. Consequently, the time delay from reading the data to using the data is T1+T2.

The above apparatus and method effectively decouple storage and data formats from GPU data formats and does so by performing detection, determination, and translation during the transfer time from SSG storage component 115 to local memory 310. This provides increased system performance and data volume transit. In particular, the performance gain results from the decreased latency due to data translation being performed as it is in transit and increased data volume if the data is compressed due the en route translation.

Figure 4:
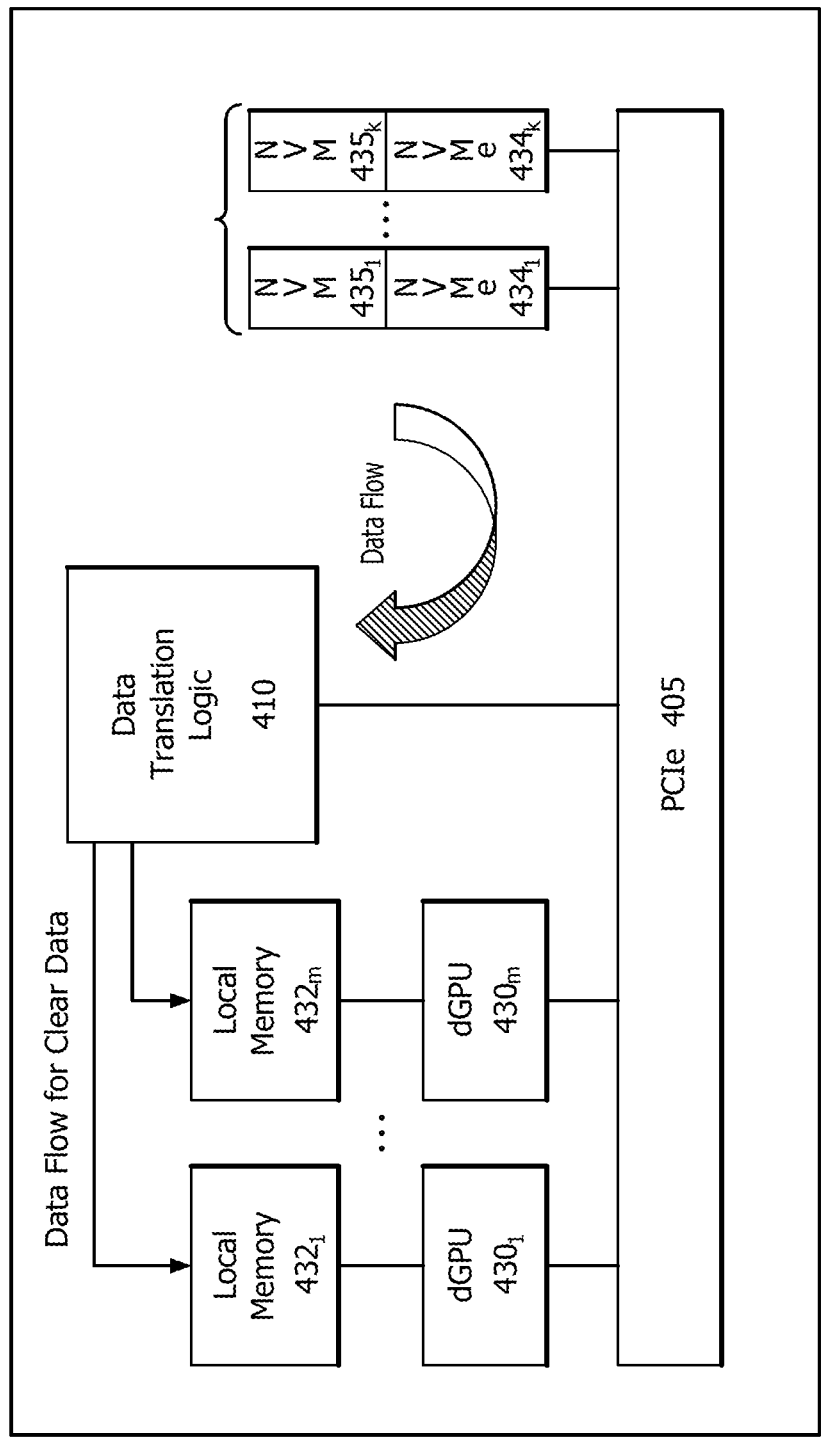
FIG. 4 is a SSG device including a DTL in accordance with certain implementations.

FIG. 4 is a SSG device 400 including a DTL 410 in accordance with certain implementations. SSG device 400 includes an expansion bus interface, such as PCIe 405, for interfacing with a host processing system (not shown). PCIe is shown for purposes of illustration and other electrical or communication interfaces may be used. PCIe 405 can be connected to DTL 410, one or more non-volatile memory (NVM) controllers $434_1$ to $434_k$, such as for example, a NVM Express (NVMe) or Non-Volatile Memory Host Controller Interface Specification (NVMHCI) device, for accessing associated NVMs $435_1$ to $435_k$ and one or more dGPUs $430_1$ to $430_m$. Each dGPU $430_1$ to $430_m$ is further connected to an associated local memory $432_1$ to $432_m$. Each NVM controller $434_1$ to $434_k$ can manage and access an associated NVM $435_1$ to $435_k$ and in particular, can decode incoming commands from a host processing system (not shown) or dGPUs $430_1$ to $430_m$. In an implementation, SSG device 400 is user reconfigurable. Operation of SSG device 400 is discussed with respect to FIG. 5.

Figure 5:
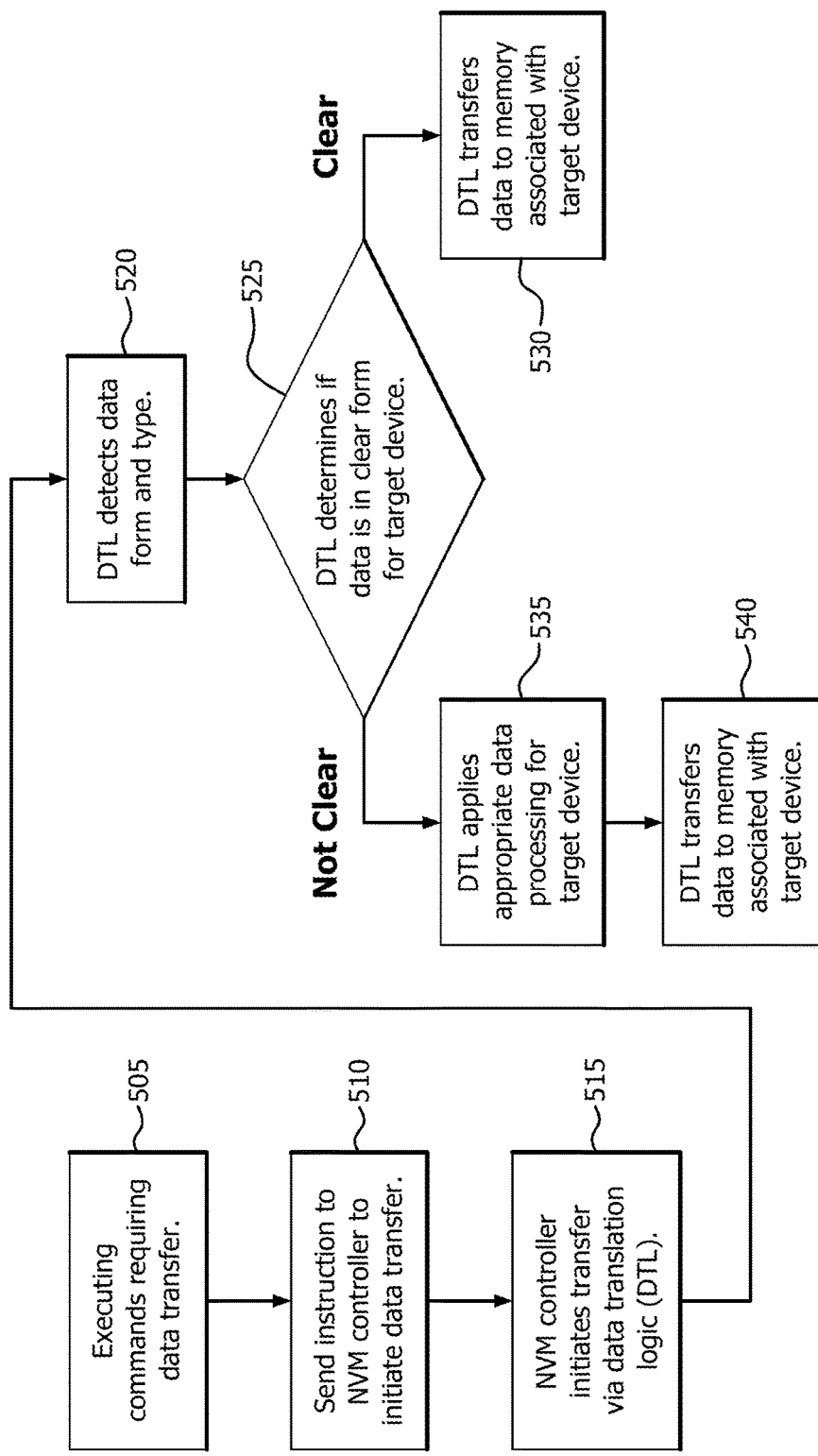
FIG. 5 is a flow chart using a SSG device including a DTL in accordance with certain implementations.
Figure 6:
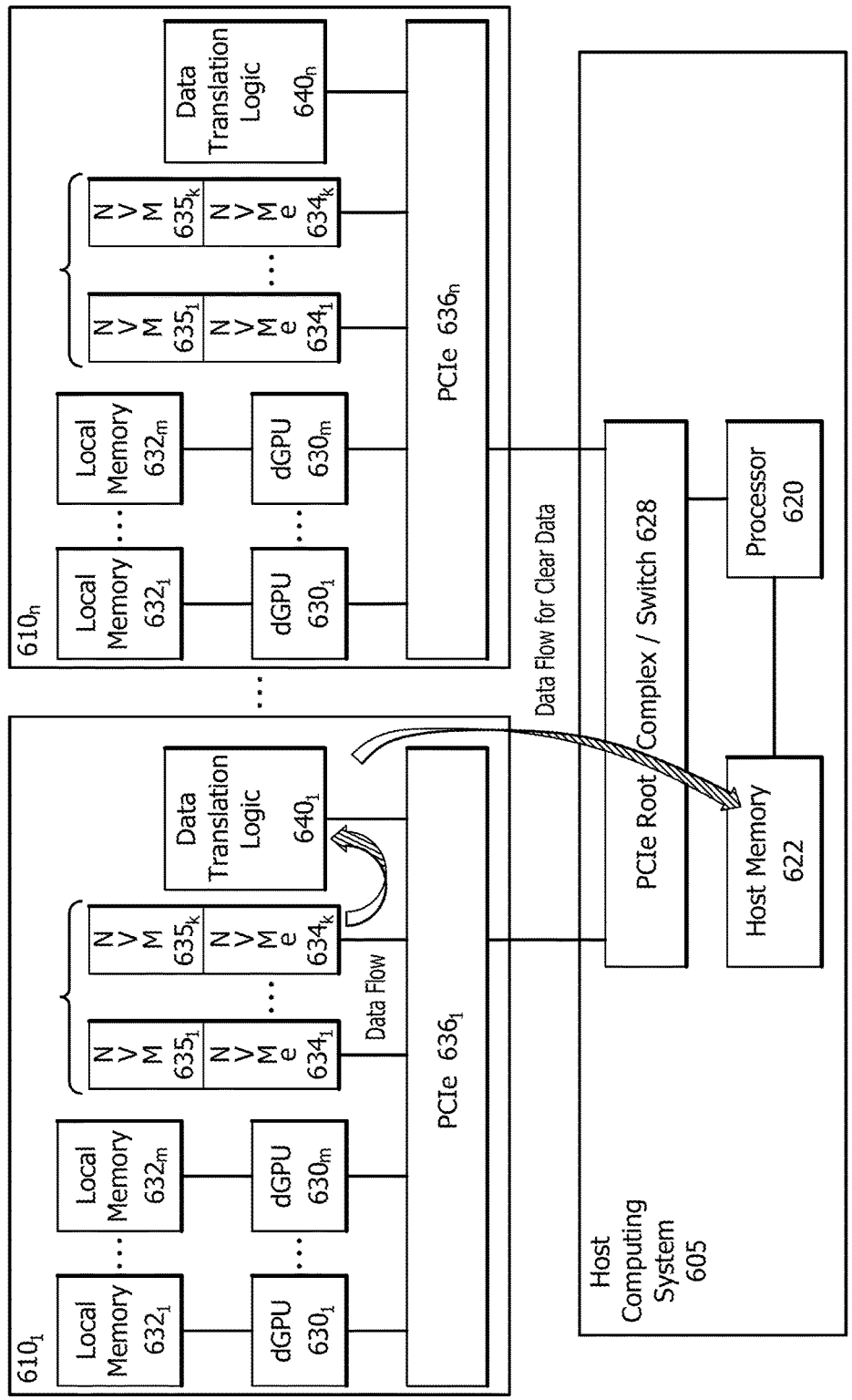
FIG. 6 is a host computing system connected to a SSG device including a DTL in accordance with certain implementations.

FIG. 5 shows an example flowchart 500 for transferring data directly between a first memory architecture on a SSG device to a second memory architecture associated with a GPU on the SSG device, (illustrated with respect to FIG. 4) or from the first memory architecture on the SSG device to a host memory in a host system that is connected to the SSG device, (illustrated with respect to FIG. 6).

As commands are executed by one or more dGPUs $430_1$ to $430_m$, certain commands may need access to at least one NVM $435_1$ to $435_k$ (step 505). A data transfer command is sent by hardware agents in one or more dGPUs $430_1$ to $430_m$ (via PCIe 405) to one or more NVM controllers $434_1$ to $434_k$ (step 510). The data transfer is initiated by one or more NVM controllers $434_1$ to $434_k$ via DTL 410 (step 515). DTL 410 detects the data form and type of the read or accessed data (read data) (step 520) and determines if the read data is in clear form for a target device, which in this illustration is one or more of dGPUs $430_1$ to $430_m$ (step 525). If the read data is in clear form, then DTL 410 transfers the read data to associated local memory $432_1$ to $432_m$ without any data formatting processing (step 530). If the read data is not in clear form, then DTL applies appropriate on-the-fly data processing to the read data in view of the requirements of one or more of dGPUs $430_1$ to $430_m$ (step 535). That is, data processing is performed en route from at least one NVM $435_1$ to $435_k$ to associated local memory $432_1$ to $432_m$. DTL 410 then transfers the now clear data to associated local memory $432_1$ to $432_m$ (step 540). In an implementation, DTL 410 can use, for example, write commands to store the appropriate data in the memory associated with the target device.

FIG. 6 shows an example processing system 600 in accordance with certain implementations. Processing system 600 can include a host computing system 605 that is connected to one or more SSG devices $610_1$ to $610_n$. SSG devices $610_1$ to $610_n$ can be implemented in a variety of architectures including for example, as part of a board that includes host computing system 605, a standalone card or an external module.

Host computing system 605 includes a processor 620, such as for example a central processing unit (CPU), which may be connected to a host memory 622, such as for example random access memory (RAM). The processor 620 can include an operating system (OS), a device driver and other nominal elements. The processor 620 can also be connected to a number of components that are known to one of ordinary skill in the art. The components may be connected to processor 620 using, for example, a high-speed serial computer expansion bus, such as but not limited to, a Peripheral Component Interconnect Express (PCIe) root complex 628. PCIe root complex 628 is shown for purposes of illustration and other electrical or communication interfaces may be used.

Each SSG device $610_1$ to $610_n$ includes a DTL $640_1$ to $640_n$ in accordance with certain implementations. Each SSG device $610_1$ to $610_n$ includes an expansion bus interface, such as PCIe $636_1$ to $636_n$, for interfacing with host processing system 605 via PCIe root complex/switch 628. Each PCIe $636_1$ to $636_n$ can be connected to one or more non-volatile memory (NVM) controllers $634_1$ to $634_k$, such as for example, a NVM Express (NVMe) or Non-Volatile Memory Host Controller Interface Specification (NVMHCI) device, for accessing associated NVMs $635_1$ to $635_k$ and one or more dGPUs $630_1$ to $630_m$, respectively. Each dGPU $630_1$ to $630_m$ is further connected to an associated local memory $632_1$ to $632_m$. Each NVM controller $634_1$ to $634_k$ can manage and access an associated NVM $635_1$ to $635_k$ and in particular, can decode incoming commands from processor 620 in host processing system 605 or dGPUs $630_1$ to $630_m$. Operation of processing system 600 is discussed with respect to FIG. 5.

As commands are executed by processor 620, certain commands may need access to at least one NVM $635_1$ to $635_k$ on at least one SSG device $610_1$ to $610_n$ (step 505). A data transfer command is sent by processor 620 (via PCIe 628 and PCIe $636_1$ to $636_n$, respectively), to one or more NVM controllers $634_1$ to $634_k$ on one or more SSG device(s) $610_1$ to $610_n$ (step 510). The data transfer is initiated by one or more NVM controllers $434_1$ to $434_k$ on one or more SSG device(s) $610_1$ to $610_n$ via DTL $640_1$ to $640_n$, as appropriate (step 515). An appropriate DTL $640_1$ to $640_n$ detects the data form and type of the read or accessed data (read data) (step 520) and determines if the read data is in clear form for a target device, which in this illustration can be one or more of dGPUs $630_1$ to $630_m$ on one or more SSG device(s) $610_1$ to $610_n$ or processor 620 (step 525). If the read data is in clear form, then an appropriate DTL $640_1$ to $640_n$ transfers the read data to associated local memory $632_1$ to $632_m$ on one or more SSG device(s) $610_1$ to $610_n$ or host memory 622 without any data formatting processing (step 530). If the read data is not in clear form, then DTL applies appropriate on-the-fly data processing to the read data in view of the requirements of at least one or more dGPUs $630_1$ to $630_m$ or processor 620 (step 535). That is, data processing is performed en route from one or more NVM $635_1$ to $635_k$ to associated local memory $632_1$ to $632_m$ on one or more SSG device(s) $610_1$ to $610_n$ or host memory 622. An appropriate DTL $640_1$ to $640_n$ then transfers the now clear data to associated local memory $632_1$ to $632_m$ on one or more SSG device(s) $610_1$ to $610_n$ or host memory 622 (step 540).

Figure 7:
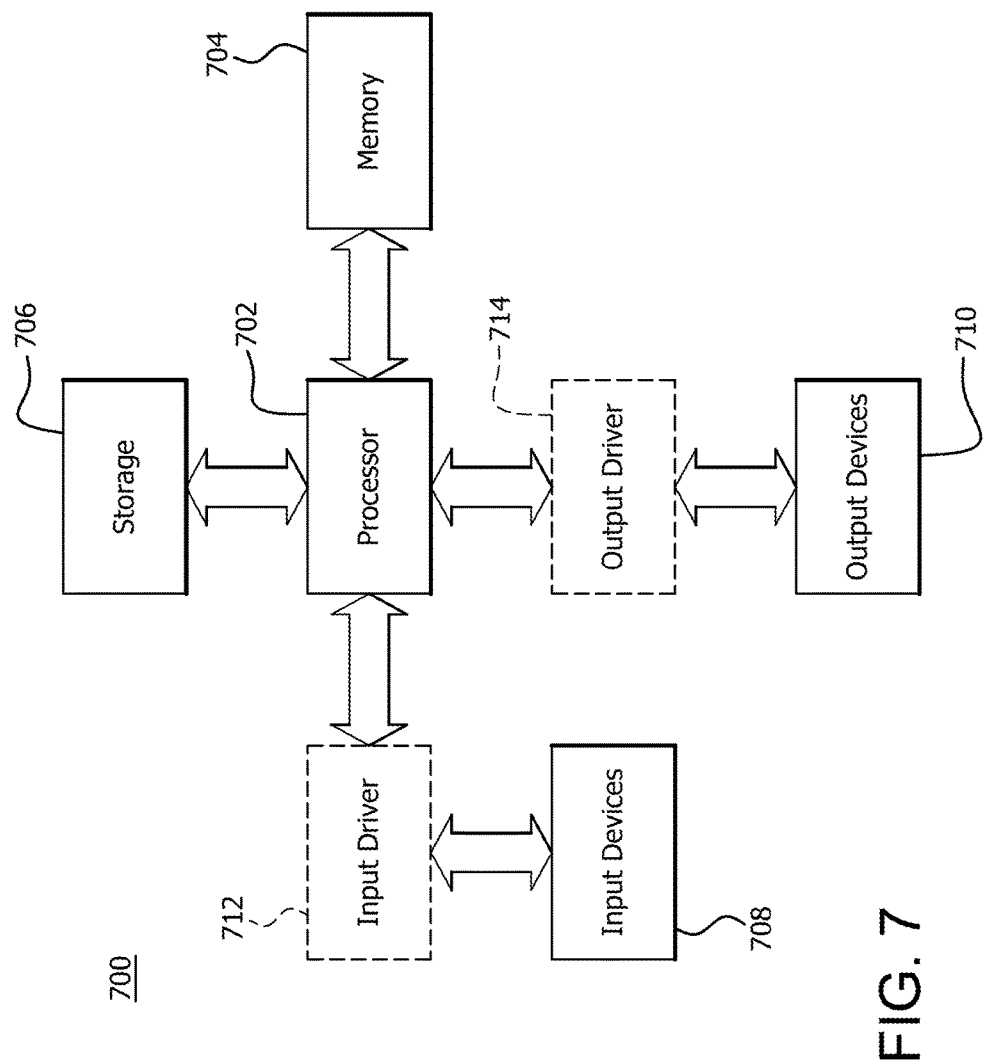
FIG. 7 is a block diagram of an example device in which one or more disclosed implementations may be implemented.

FIG. 7 is a block diagram of an example device 700 in which one portion of one or more disclosed implementations may be implemented. The device 700 may include, for example, a head mounted device, a server, a computer, a gaming device, a handheld device, a set-top box, a television, a mobile phone, or a tablet computer. The device 700 includes a processor 702, a memory 704, a storage 706, one or more input devices 708, and one or more output devices 710. The device 700 may also optionally include an input driver 712 and an output driver 714. It is understood that the device 700 may include additional components not shown in FIG. 7.

The processor 702 may include a central processing unit (CPU), a graphics processing unit (GPU), a CPU and GPU located on the same die, or one or more processor cores, wherein each processor core may be a CPU or a GPU. The memory 704 may be located on the same die as the processor 702, or may be located separately from the processor 702. The memory 704 may include a volatile or non-volatile memory, for example, random access memory (RAM), dynamic RAM, or a cache.

The storage 706 may include a fixed or removable storage, for example, a hard disk drive, a solid state drive, an optical disk, or a flash drive. The input devices 708 may include a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 310 may include a display, a speaker, a printer, a haptic feedback device, one or more lights, an antenna, or a network connection (e.g., a wireless local area network card for transmission and/or reception of wireless IEEE 802 signals).

The input driver 712 communicates with the processor 702 and the input devices 708, and permits the processor 702 to receive input from the input devices 708. The output driver 714 communicates with the processor 702 and the output devices 710, and permits the processor 702 to send output to the output devices 710. It is noted that the input driver 712 and the output driver 714 are optional components, and that the device 700 will operate in the same manner if the input driver 712 and the output driver 714 are not present.

In general and without limiting implementations described herein, a computer readable non-transitory medium including instructions which when executed in a processing system cause the processing system to execute a method for transferring data directly from a second memory architecture associated with a GPU to a first memory architecture.

It should be understood that many variations are possible based on the disclosure herein. Although features and elements are described above in particular combinations, each feature or element may be used alone without the other features and elements or in various combinations with or without other features and elements.

The methods provided may be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors may be manufactured by configuring a manufacturing process using the results of processed hardware description language (HDL) instructions and other intermediary data including netlists (such instructions capable of being stored on a computer readable media). The results of such processing may be maskworks that are then used in a semiconductor manufacturing process to manufacture a processor which implements aspects of the embodiments.

The methods or flow charts provided herein may be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A solid state graphics (SSG) device, comprising:
   at least one first memory architecture and an associated first memory architecture controller;
   at least one graphics processing unit (GPU);
   a second memory architecture associated with each GPU;
   a data translator; and
   an expansion bus interface connected to each associated first memory architecture controller, the at least one GPU, and the data translator,
   wherein the data translator:
   en route detects a data form of data read from the at least one first memory architecture in response to a data transfer command and received at the data translator via the associated first memory architecture controller and expansion bus interface;
   en route determines if read data is in clear form for a target device;
   en route applies data processing to the read data to generate clear data with respect to the target device when the read data is not in clear form; and
   transfers the clear data to a target memory associated with the target device.

2. The SSG device of claim 1, wherein the target device is the at least one GPU.

3. The SSG device of claim 2, wherein the target memory is the second memory architecture.

4. The SSG device of claim 3, wherein the second memory architecture is local memory and the at least one first memory architecture is a non-volatile memory.

5. The SSG device of claim 3, wherein the data transfer command is sent by the at least one GPU.

6. The SSG device of claim 1, wherein the expansion bus interface is connected to a host processing system including a processor connected to a host memory and the target device is the processor.

7. The SSG device of claim 6, wherein the target memory is the host memory.

8. The SSG device of claim 7, wherein the data transfer command is sent by the processor.

9. The SSG device of claim 8, wherein the at least one first memory architecture is a non-volatile memory.

10. The SSG device of claim 2, wherein the expansion bus interface is connected to a host processing system including a processor and the data transfer command is sent by the processor.

11. A method for transferring data, the method comprising:
    receiving, at a data translator via at least an expansion bus interface, data read from at least one first memory architecture in response to a data transfer command from a requesting device, wherein the data translator, the expansion bus interface and the at least one first memory architecture are part of a solid state graphics (SSG) device;
    en route detecting, by the data translator, a data form of read data;
    en route determining, by the data translator, if the read data is in clear form for a target device;
    en route applying, by a data translator, data processing to the read data to generate clear data with respect to the target device when the read data is not in clear form; and
    transferring, by the data translator, the clear data to a target memory.

12. The method of claim 11, wherein the target device is at least one graphics processing unit (GPU) and the at least one GPU is part of the SSG device.

13. The method of claim 12, wherein the target memory is a second memory architecture associated with the at least one GPU and the second memory architecture is part of the SSG device.

14. The method of claim 13, wherein the second memory architecture is local memory and the at least one first memory architecture is a non-volatile memory.

15. The method of claim 14, wherein the requesting device is the at least one GPU.

16. The method of claim 14, wherein the expansion bus interface is connected to a host processing system that includes a processor and the requesting device is a processor.

17. The method of claim 11, wherein the expansion bus interface is connected to a host processing system that includes a processor and a host memory and the target device is the processor.

18. The method of claim 17, wherein the target memory is the host memory.

19. The method of claim 18, wherein the requesting device is the processor.

20. The method of claim 18, wherein the at least one first memory architecture is a non-volatile memory.

* * * * *